W. M. WHEILDON.
FASTENING DEVICE.
APPLICATION FILED SEPT. 19, 1908.
929,063.
Patented July 27, 1909.
Fig. 1.
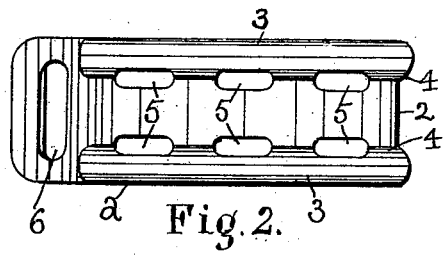
Fig. 2.
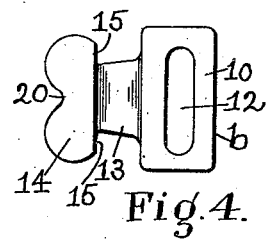
Fig. 4.
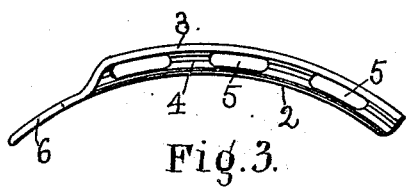
Fig. 3.
Fig. 5.
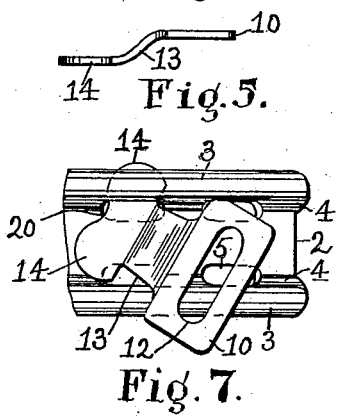
Fig. 7.
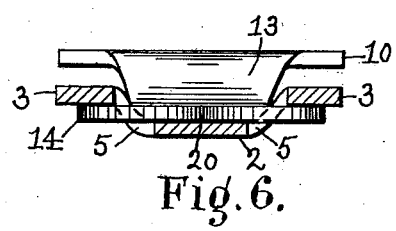
Fig. 6.
Witnesses.
C. H. Gannett
J. Murphy
Inventor.
William M. Wheildon
by Jas. H. Churchill
Atty.

UNITED STATES PATENT OFFICE.

WILLIAM M. WHEILDON, OF ASHLAND, MASSACHUSETTS.

FASTENING DEVICE.

No. 929,063.      Specification of Letters Patent.      Patented July 27, 1909.

Application filed September 19, 1908. Serial No. 453,730.

*To all whom it may concern:*

Be it known that I, WILLIAM M. WHEILDON, a citizen of the United States, residing in Ashland, county of Middlesex, and State of Massachusetts, have invented an Improvement in Fastening Devices, of which the following description, in connection with the accompanying drawings, is a specification, like characters on the drawings representing like parts.

This invention relates to a fastening device, and is herein shown as embodied in a device especially adapted among other uses to be employed on overshoes or arctics.

The present invention has for its object to provide a simple, efficient and inexpensive fastening device, which presents a smooth exterior surface in its engaged or locked condition, whereby it is especially useful on overshoes or arctics, inasmuch as it does not afford opportunity for the skirts of ladies and the trousers of men to catch upon and be torn or otherwise injured by the fastening devices, while at the same time a neat appearance is given to the arctic.

The invention further has for its object to provide a fastening device, which cannot be forced or otherwise accidentally opened as will be described.

These and other features of this invention will be pointed out in the claims at the end of this specification.

Figure 1 represents an overshoe or arctic provided with fastening devices embodying this invention. Fig. 2, a plan view of one member of the fastening device. Fig. 3, a side elevation of the member shown in Fig. 2. Fig. 4, a plan view of the other member of the fastening device. Fig. 5, a side elevation of the member shown in Fig. 4. Fig. 6, a sectional detail to be referred to, and Fig. 7, a detail in plan to be referred to.

Referring to Figs. 2 to 7 inclusive, *a* represents one member, and *b* the other member of a fastening device embodying this invention. The member *a* may be designated the slotted member and the member *b* the hook member. The slotted member *a* is preferably made from sheet metal and is stamped out or shaped to form a central portion 2, and raised portions 3 on opposite sides of the central portion, which are connected with the latter by preferably inclined walls 4, having slots or openings 5. The central portion 2 may be extended beyond one end of the raised side portions 3 and provided with a transverse slot 6 for the passage of a tab or piece of cloth or other material, not shown, but which forms part of the overshoe or arctic *c* and is such as now commonly used, to secure the members of the ordinary buckle to the overshoe. The hook member *b* is also preferably made of sheet metal, which is stamped out or shaped to form a substantially flat portion 10 having a slot 12 for the passage of a tab or piece referred to, an inclined neck or shank portion 13 and a substantially flat transverse portion 14, which lies in a lower plane than the flat portion 10 and is extended laterally beyond the neck or shank portion 13 to form locking shoulders 15, which are designed to engage the end walls of the slots 5 in the member *a*. The transverse portion 14 may be designated the hook proper. The neck portion 13 of the hook member is made narrower than the distance between the raised side portions 3 of the slotted member, so that the said neck portion may extend between said sides when the members *a*, *b* are in engagement, (see Fig. 6).

Provision is made for permitting the hook 14 to be made of maximum length so that its ends will project well under the raised sides 3 of the slotted member as shown in Fig. 6 and thus secure a firm locking engagement of the two members, which is accomplished as hereinshown by providing the front edge of the hook 14 with a reëntrant portion or recess 20 and preferably by making the front edge curved or rounding on opposite sides of said recess.

By reference to Fig. 7, it will be seen that the recess 20 enables the hook member to be turned, after one end of the hook has been inserted into a slot 5 until the wall of the recess 20 meets an end wall of the slot 5, at which time the other end of the hook is clear of the opposite side of the slotted member and lies on the central portion of the said member and in position to be inserted through its slot 5 in the opposite inclined wall 4, by turning the hook member backward until the neck 13 is in line with the central portion 2 of the slotted member, as represented in Fig. 6. It will be seen that in order to engage the hook member with the slotted member, one end of the hook is first inserted in its slot and then the said hook member is given a pivotal or rotary movement in a plane substantially parallel with the slotted member in order to bring the other end of the hook between the raised portions 3 of the slotted member, after which the hook member is turned in the reverse direction to enter the free end of the hook into the slot with which it coöperates. To disengage the hook member, the latter is first turned or rotated to withdraw one end of the hook from its slot, after which the other end may be readily withdrawn from its slot. It will thus be seen, that in order to engage and disengage the members of the fastening device, one of said members must be rotated or turned in a plane substantially parallel with the other member before engagement or disengagement can be effected. In actual use of the overshoe c the strain or force necessary to effect the rotary movement referred to, is not obtainable and therefore, the fastening device when in use is locked against accidental disengagement or unlocking, which is an important feature practically.

By reference to Fig. 6, it will be seen, that the projecting ends of the hook are extended under the raised portions 3 of the slotted member, and consequently the outer or exposed surface of the fastening device when in use, is smooth and free from projections, which are liable to catch in the skirts of ladies and tear the same, and which also are liable to wear away the skirts of ladies and the trousers of men. As a result of the smooth outer surface of the fastening device, the overshoe c shown in Fig. 1, presents a neat appearance and can be worn by ladies and men without injury to the garments, which make contact with the overshoes.

I have herein shown the invention as embodied in a fastening device especially adapted for use on overshoes, but I do not desire to limit my invention in this respect.

Claims.

1. A fastening device comprising a slotted member and a hook member, said slotted member having a central portion, raised side portions, and walls connecting said central portion with said raised side portions and provided with slots and said hook member having an inclined neck portion capable of extending between said raised side portions, and projections extended transversely of said neck portion beyond the same to form locking shoulders to enter the slots in the slotted member, substantially as described.

2. A fastening device comprising a slotted member and a hook member, said slotted member having raised side portions and slots located below said side portions, and said hook member having a neck portion and an end portion extended laterally from said neck portion to form a hook of a length greater than the distance between the raised side portions of the slotted member, to compel rotary movement of one member with relation to the other to effect engagement and disengagement of said members, substantially as described.

3. A fastening device comprising a slotted member and a hook member, said slotted member having raised side portions and slots located below said side portions, and said hook member having a neck portion and an end portion extended laterally from said neck portion to form a hook of a length greater than the distance between the raised side portions of the slotted member, and having a recess in its front edge, substantially as described.

4. A fastening device comprising a member having side portions, an intermediate portion in a different plane from said side portions and slots between said portions, and a coöperating member having a hook portion to enter the said slots and of a length greater than the distance between said raised portions to compel rotary movement of one member in a plane substantially parallel with the other member to effect engagement and disengagement of said members, substantially as described.

5. A fastening device comprising a slotted member having a central portion in one plane and portions on opposite sides of said central portion in a different plane from the central portion, and a hook member having a neck portion and a hook of a length greater than the width of said central portion and extended under said raised portions, substantially as described.

In testimony whereof, I have signed my name to this specification in the presence of two subscribing witnesses.

WILLIAM M. WHEILDON.

Witnesses:
  JAS. H. CHURCHILL,
  J. MURPHY.